United States Patent
Nitta (10) Patent No.: US 7,982,902 B2
(45) Date of Patent: Jul. 19, 2011

(54) PRINTER, IMAGE PROCESSING DEVICE, IMAGE PROCESSING METHOD, AND RECORDING MEDIUM

(75) Inventor: Takashi Nitta, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 12/266,038

(22) Filed: Nov. 6, 2008

(65) Prior Publication Data

US 2009/0067001 A1 Mar. 12, 2009

Related U.S. Application Data

(60) Division of application No. 11/108,199, filed on Apr. 18, 2005, now abandoned, which is a continuation of application No. 09/564,331, filed on May 3, 2000, now Pat. No. 6,882,440, which is a continuation of application No. PCT/JP99/05042, filed on Sep. 16, 1999.

(30) Foreign Application Priority Data

Sep. 16, 1998 (JP) .................................. 1998-262128
Aug. 31, 1999 (JP) .................................. 1999-246441

(51) Int. Cl.
*G06F 3/12* (2006.01)
(52) U.S. Cl. ...... 358/1.16; 358/1.17; 358/524; 382/298; 382/305
(58) Field of Classification Search .................. 358/1.16, 358/1.17, 1.9, 524, 518, 501; 348/237, 238, 348/246, 247; 382/298, 293, 299, 300, 305, 382/254, 274, 275
See application file for complete search history.

(56) References Cited

U.S. PATENT DOCUMENTS 5,084,831 A * 1/1992 Morikawa et al. ........... 358/1.17
5,087,971 A   2/1992 Sakata et al.
(Continued)

FOREIGN PATENT DOCUMENTS

JP   63-135257   6/1988
(Continued)

OTHER PUBLICATIONS

English Abstract of JP 10-229544 dated Aug. 25, 1998.
(Continued)

*Primary Examiner* — David K Moore
*Assistant Examiner* — Ashish K Thomas
(74) *Attorney, Agent, or Firm* — Ladas & Parry LLP (57) ABSTRACT

The object of the present invention is to provide a printer capable of efficiently processing print data corresponding to a plurality of images in the main scanning direction, as in the case of an index print, with a limited memory capacity, thereby improving the throughput, and an image data processing method for executing the operations of the printer. An image data processing section accesses original image data including partial images of a plurality of images printed through one main scanning, and generates bit image data by executing predetermined image processing. An image data control section temporarily stores the image data in a primary buffer, and when necessary, reads out a part thereof from the primary buffer band by band, copies the read data to a band (secondary) buffer, and sends the data to a print processing section. Therefore, it is no longer necessary to access the original image data to obtain each portion of the partial images and execute predetermined image processing each time when the necessity arises, thereby improving the processing efficiency.

1 Claim, 9 Drawing Sheets

U.S. PATENT DOCUMENTS

| | | | |
|---|---|---|---|
| 5,494,360 | A | 2/1996 | Watanabe et al. |
| 5,523,128 | A * | 6/1996 | Itoh et al. ............... 428/1.26 |
| 5,602,655 | A | 2/1997 | Arakawa et al. |
| 5,608,542 | A | 3/1997 | Krahe et al. |
| 5,635,984 | A | 6/1997 | Lee |
| 5,923,828 | A | 7/1999 | Yagishita |
| 5,999,276 | A | 12/1999 | Narita |
| 6,009,242 | A | 12/1999 | Anzai |
| 6,034,783 | A * | 3/2000 | Honma et al. ............ 358/1.16 |
| 6,111,605 | A | 8/2000 | Suzuki |
| 6,111,659 | A | 8/2000 | Murata |
| 6,121,993 | A | 9/2000 | Maekawara et al. |
| 6,330,067 | B1 | 12/2001 | Murata |
| 6,352,326 | B1 | 3/2002 | Maeda |
| 6,606,161 | B2 | 8/2003 | Murata |
| 6,734,988 | B2 | 5/2004 | Murata |
| 6,750,987 | B1 | 6/2004 | Murata |
| 6,924,902 | B2 | 8/2005 | Murata |
| 6,943,906 | B2 | 9/2005 | Murata |
| 6,980,316 | B2 * | 12/2005 | Sugiyama ................. 358/1.16 |
| 7,054,028 | B2 | 5/2006 | Murata |
| 7,324,239 | B2 * | 1/2008 | Yamagata ................. 358/1.9 |

FOREIGN PATENT DOCUMENTS

| | | |
|---|---|---|
| JP | 2-96878 | 4/1990 |
| JP | 04-301473 | 10/1992 |
| JP | 7-125374 | 5/1995 |
| JP | 07-144459 | 6/1995 |
| JP | 08-079497 | 3/1996 |
| JP | 08-152977 | 6/1996 |
| JP | 08-181809 | 7/1996 |
| JP | 08-252949 | 10/1996 |
| JP | 08-310060 | 11/1996 |
| JP | 09-011510 | 1/1997 |
| JP | 9-93376 | 4/1997 |
| JP | 9-130590 | 5/1997 |
| JP | 196 45 716 | 5/1997 |
| JP | 9-297840 | 11/1997 |
| JP | 10-181142 | 7/1998 |
| JP | 10-229490 | 8/1998 |
| JP | 10-229541 | 8/1998 |
| JP | 10-229544 | 8/1998 |
| JP | 10-229544 A | 8/1998 |
| JP | 11-032295 | 2/1999 |
| JP | 11-078131 | 3/1999 |
| JP | 11-146308 | 5/1999 |
| JP | 11-240231 | 9/1999 |
| JP | 11-284842 | 10/1999 |

OTHER PUBLICATIONS

English machine translation of JP 10-229544 A.
English abstract of JP 9-130590 dated May 16, 1997.
Patent Abstract of JP 10-229490 Dated Aug. 25, 1998.
Patent Abstract of JP 10-181142 Dated Jul. 7, 1998.
Patent Abstract of JP 11-078131 Dated Mar. 23, 1999.
Patent Abstract of JP 11-284842 Dated Oct. 15, 1999.
Patent Abstract of JP 11-032295 Dated Feb. 2, 1999.
Patent Abstract of JP 11-240231 Dated Sep. 7, 1999.
Patent Abstract of JP 07-144459 Dated Jun. 6, 1995.
Patent Abstract of JP 08-152977 Dated Jun. 11, 1996.
Patent Abstract of JP 63-135257 Dated Jun. 7, 1988.
Patent Abstract of JP 11-146308 Dated May 28, 1999.
Patent Abstract of JP 08-181809 Dated Jul. 12, 1996.
Patent Abstract of JP 10-229541 Dated Aug. 25, 1998.
Patent Abstract of JP 08-079497 Dated Mar. 22, 1996.
Patent Abstract of JP 08-252949 Dated Oct. 1, 1996 and JPO Computer English Translation.
Patent Abstract of JP 04-301473 Dated Oct. 26, 1992.
Patent Abstract of JP 08-310060 Dated Nov. 26, 1996.
Patent Abstract of JP 09-011510 Dated Jan. 14, 1997.
English Patent Abstract of Japan 2-96878 Published Apr. 9, 1990.
English Patent Abstract of Japan 9-297840 Published Nov. 18, 1997.

* cited by examiner

PRINTER, IMAGE PROCESSING DEVICE, IMAGE PROCESSING METHOD, AND RECORDING MEDIUM

This application is a divisional of application Ser. No. 11/108,199 filed on Apr. 18, 2005, now abandoned which is a CON of application Ser. No. 09/564,331 filed on May 3, 2000 (now U.S. Pat. No. 6,882,440) which is a CON of International Application PCT/JP99/05042 filed on Sep. 16, 1999, which designated the U.S., claims the benefit thereof and incorporates the same by reference.

BACKGROUND OF THE INVENTION

1. Field of the Invention

The present invention relates generally to a printer, an image processing device, an image processing method, and a recording medium for directly (without the help of a host computer) reading and printing image data taken with an apparatus such as a digital camera, and stored in a medium such as a memory card. More specifically, the present invention relates to an image data processing technique for making an index print.

2. Related Background Art

Recently, the digital camera has become increasingly popular with the improvement of their performance. Conventionally, when image data taken with the digital camera is to be printed, the image data stored in the memory card or the like is read by a personal computer to go through various image processing steps, and the processed data is printed by a printer.

Compared with the conventional photographs by silver-salt photographic films, it is easier for image data taken with the digital camera to carry out image processing operations such as enlargement, downscaling, and color correction. For example, a user can make an index print, in which a plurality of images taken with a digital camera are scaled down and collectively printed on a single piece of printing paper, by use of certain application software run on a personal computer.

In the index print, about 20 images, each approximately 5×4 cm in size, are collectively printed on the paper with the size of a post card. In order to obtain such an index print, it is necessary to execute several image processing operations such as the downscaling or rotating of images, by using a personal computer. As a result, a large working area for the image processing is required. Because of this, conventional application software makes so-called spool files by executing the image-processing on only the specific image data necessary to be printed.

Figure 1:
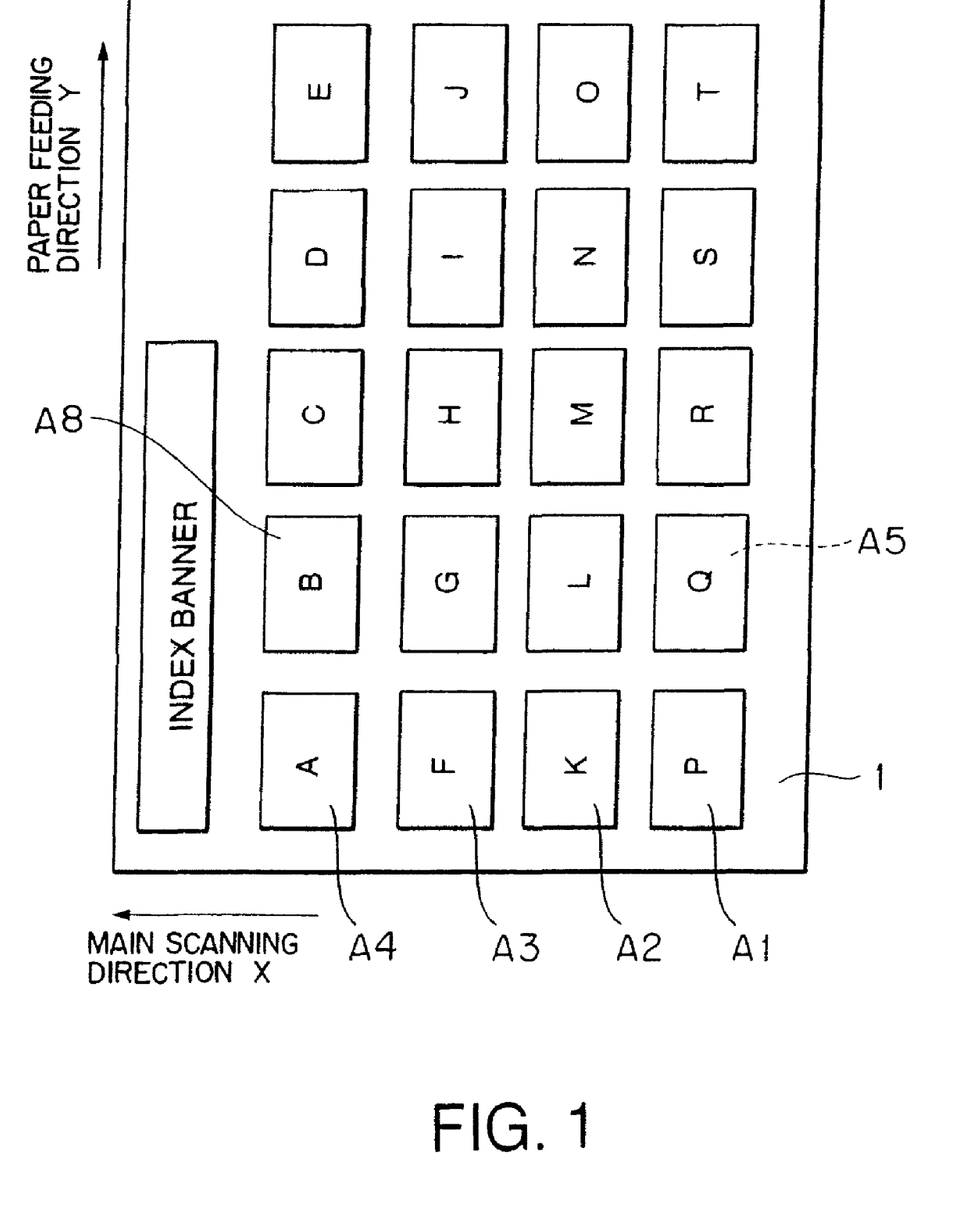
FIG. 1 illustrates an example of an index print, in which scaled down images are placed so that a viewer sees them correctly when the paper is placed horizontally.

FIG. 1 illustrates an example of an index print, in which 20 pieces of scaled-down images A1, A2, A3, . . . are printed to a sheet with the size of the postcard 4 pieces to lateral direction by 5 pieces to longitudinal direction. In FIG. 1, the lateral direction is main scanning direction X of an ink jet printer, and the longitudinal direction is the paper-feeding (sub-scanning) direction Y of the ink jet printer.

In FIG. 1, the images are arranged so that a viewer can see them correctly when the paper is placed horizontally. As can be understood from the orientation of the symbols A, B, . . . , the original images are rotated by 90 degrees in FIG. 1.

As mentioned above, in the index print, a plurality of images are printed on a single piece of paper. As a result, compared with an ordinary print in which only one image is printed on a single piece of paper, an index print takes more time to complete. Furthermore, if images to be printed are rotated, as shown in FIG. 1, even more time is required, because the image processing for rotation is necessary.

Figure 2:
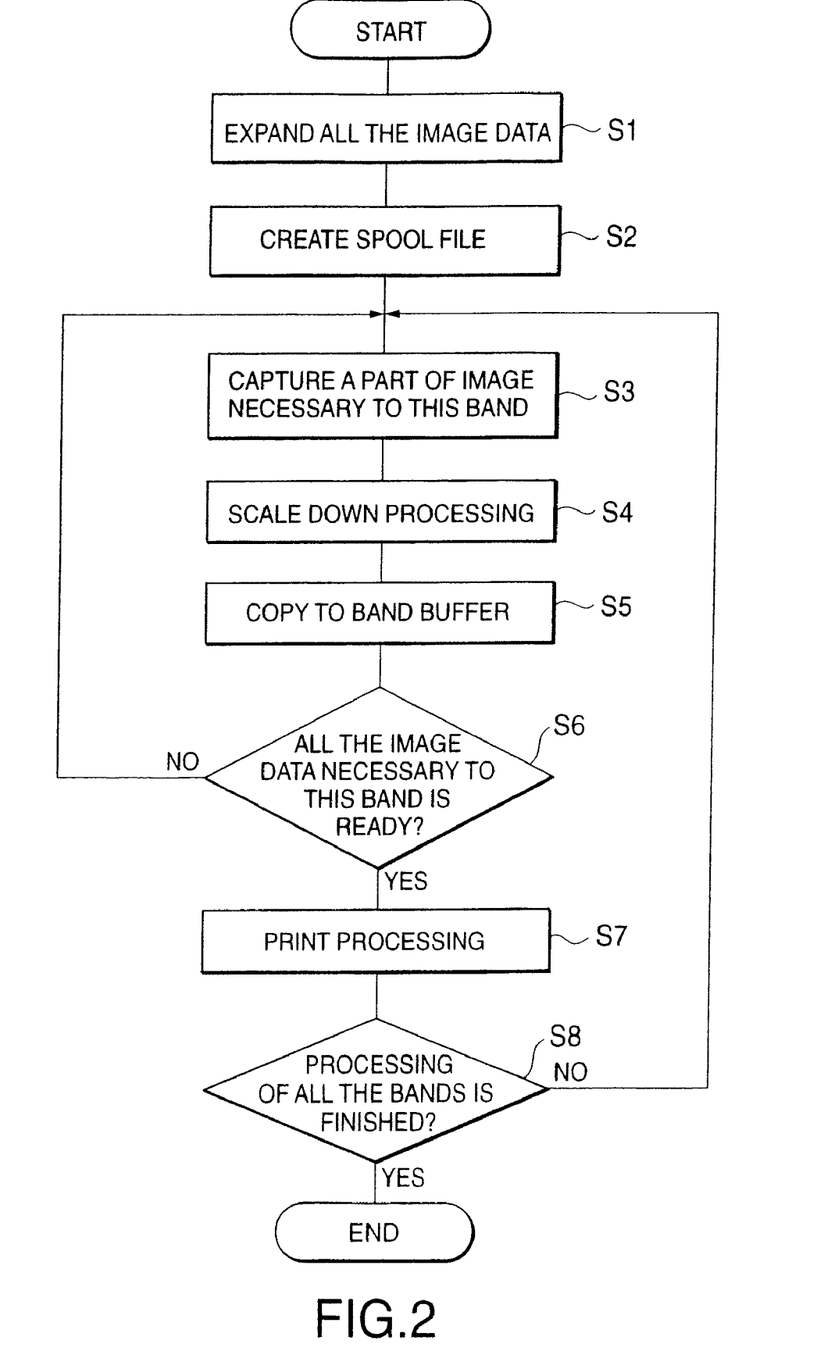
FIG. 2 is a flowchart of the processing procedure of conventional application software for making an index print.

FIG. 2 is a flowchart showing the processing steps of conventional application software for making an index print. Hereinafter, the conventional processing steps for making an index print will be specifically described. In FIG. 2, the index print is performed by use of the ink jet printer having a band buffer, in which image data is expanded (decompressed) for print band by band.

Among the image data taken with the digital camera, compressed in JPEG format etc., and stored in the PC card or the like, the data needed for the index print is expanded (Step S1). Next, a spool file for the expanded image data is created on the hard disk (Step S2).

Then, a part of the image data necessary for each band is captured (Step S3) for carrying out some processing operations such as downscaling and rotation (Step S4). After this, the data are copied (expanded) to the band buffer (Step S5). If the entire image data in each band (in FIG. 1, A1, A2, A3 and A4, i.e., A, F, K, and P) have not yet been processed in the above-mentioned steps S3 to S5, the steps S3 to S5 are repeated ("NO" at Step S6).

If the entire image data in each band is ready in the band buffer ("YES" at Step S6), the image data in the band buffer is transferred to a printer to be printed (Step S7).

The steps S3 to S7 are repeated until all of the bands are processed ("NO" at Step S8), and when all of the bands are processed ("YES" at Step 8), the printing operation is completed.

Recently, a printer has been developed which is provided with an image data processing function substantially the same as that of a personal computer, and can read, without the help of a host computer, image data taken with a digital camera or the like and stored in a memory card or the like in order to print after carrying out proper image processing. This printer will hereinafter be referred to as "photo printer".

Briefly summarized, the photo printer includes a print processing section for performing the same operations as conventional printers, and a photo image processing section for processing image data read from the memory card or the like in a manner similar to that of the personal computer.

Photo printers are very useful because it is possible to print image data taken by the digital camera without using the personal computer. Therefore, if it were possible to supply photo printers at a lower price, they would become much more popular with the improvement of resolution of the digital camera.

However, because the photo printer has both an image processing function similar to that of the personal computer and ordinary printer functions, the costs thereof tend to become high. In order to reduce the costs, the throughput or the speed of a CPU in a photo printer and the capacity of a RAM used as a working memory must be limited.

In other words, although the photo printer is capable of executing image data processing in a manner similar to a personal computer, the performance of its CPU should be limited in terms of the throughput and the speed. Further, the capacity of the buffer memory for temporarily storing image data should also be limited.

Therefore, when it is necessary for such a photo printer to temporarily store a huge volume of image data in a memory in order to perform downscaling or rotating operations, as in the case of performing the above-mentioned index print, the capacity of the buffer memory may be insufficient.

If the index print is performed by use of the above-mentioned application software run on a personal computer, there would be no problem because recent personal computers have high-performance CPUs and enough RAM capacity used as the working area. Furthermore, it may be possible to store the data on a hard disk in the form of a spool file.

However, it would be very difficult for the photo printer with a limited memory resource to complete operations that require the processing of a huge volume of image data, such as an index print, without reducing the throughput of the printing operation.

Conventionally, few effective proposals have been offered in order to solve the above problem in terms of the structure or the image data processing control method of the photo printer.

SUMMARY OF THE INVENTION

The purpose of the present invention is to provide a printer, an image processing device, an image processing method, and a recording medium which can perform the print processing of a lot of amount of the image data such as an index print at short time without cutting down throughput, even if CPU performance and memory capacity are limited.

In order to attain the above-mentioned purpose, a printer for printing onto a print medium by moving a carriage having a print head alternately in a main scanning direction and a sub scanning direction, comprising:

image processing means for generating bit image data by executing predetermined image processing on digital image data from outside;

first image data storing means for storing said bit image data;

second image data storing means for storing said bit image data corresponding to images printed during one main scanning of said carriage; and storage control means for controlling transfers of said bit image data from said first image data storing means to said second image data storing means.

By the above-mentioned configuration, at each time when the carriage scans in the main scanning direction, it is unnecessary to perform the image processing by reading out the digital image data from outside, thereby speeding up the print processing.

Furthermore, a printer for printing onto a print medium by moving a carriage having a print head alternately in a main scanning direction and a sub scanning direction, comprising:

image processing means for generating bit image data by executing predetermined image processing on digital image data inputted from outside;

first image data storing means for storing said bit image data;

data volume determining means for determining whether or not the volume of said bit image data corresponding to images printed during one main scanning of said carriage exceeds the maximum memory capacity of said first image data storing means; and storage control means for storing said bit image data in said first image data storage means when said data volume determining means determine that the volume of said bit image data corresponding to images printed during one main scanning of said carriage does not exceed the maximum memory capacity of said first image data storing means, and for providing a part of said digital image data necessary for (printing) to said image processing means without using said first image data storage means when said data volume determining means determine that the volume of said bit image data corresponding to images printed during one main scanning of said carriage exceeds the maximum memory capacity of said first image data storing means.

Thus, when there is a lot of amount of the image data to be printed, the present invention reads out only the necessary data from outside and prints after performing the image processing. It is possible to print without difficulty, even if there is a limit to memory capacity of the recording means storing the bit image data.

DESCRIPTION OF THE PREFERRED EMBODIMENTS

Hereinafter, the preferred embodiments of the printer according to the present invention are described with reference to the drawings.

First Embodiment

The printer according to the first embodiment is a photo printer which can directly read image data taken with the digital camera or the like and stored in the memory card or the like, without the help of a host computer, and then print after carrying out predetermined image processing. Furthermore, the printer according to the first embodiment is a serial type ink jet printer, in which a carriage having a print head moves alternately in the main scanning direction and the sub scanning direction.

Figure 3:
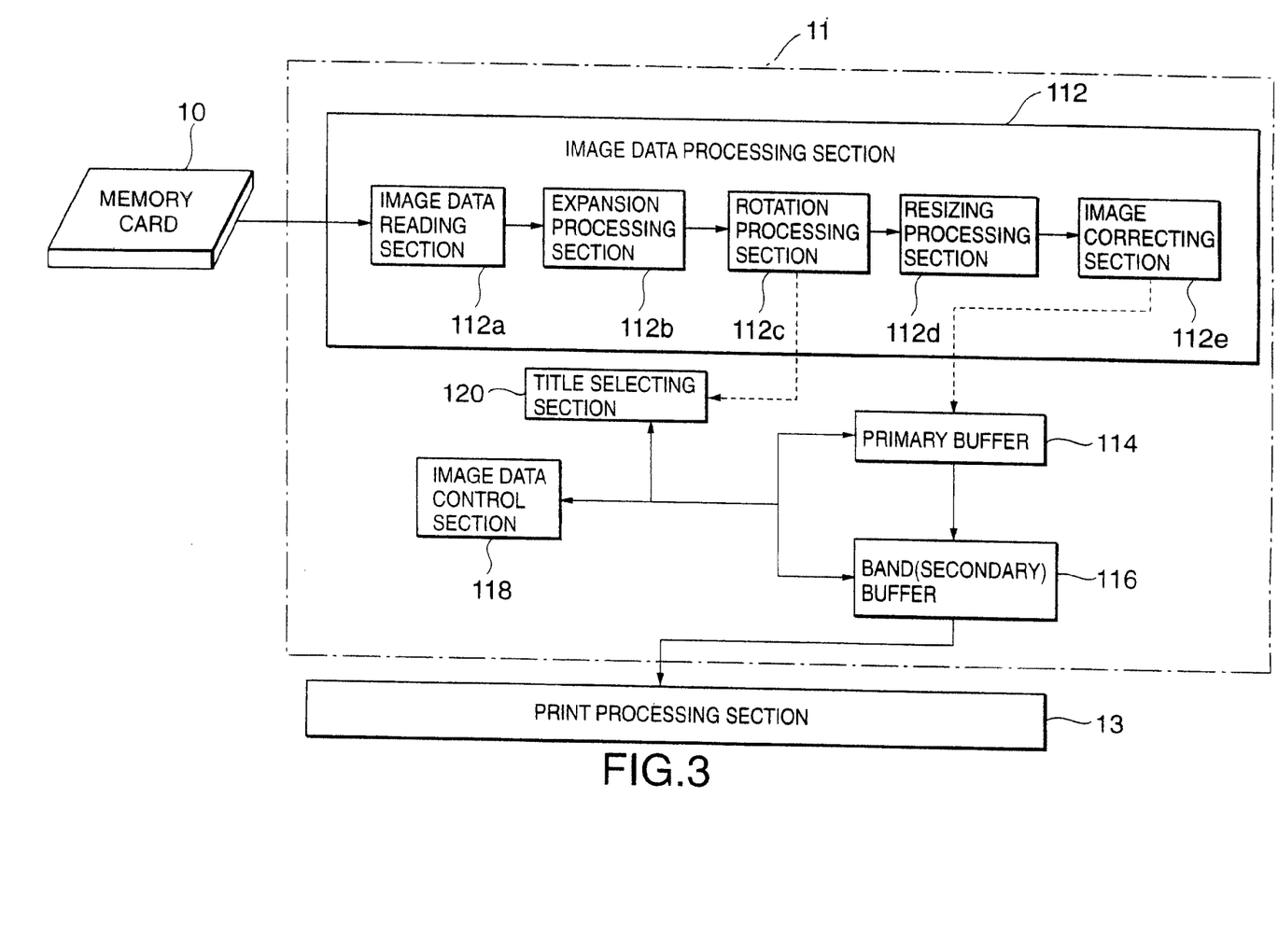
FIG. 3 is a block diagram showing a rough structure of a printer of the first embodiment according to the present invention.

FIG. 3 is a block diagram schematically showing the structure of the printer according to the first embodiment of the present invention. The printer may be roughly divided into a photo image processing section 11 and a print processing section 13.

The print processing section 13 performs the same operations as those of conventional printers. Although omitted in FIG. 3, the print processing section 13 is provided with a print engine section having an ink jet type print head, a carriage mechanism, a paper feeding mechanism and the like, and a print control section.

The photo image processing section 11 executes image processing on original image data read from a memory card 10, in a manner similar to
a personal computer, and includes the image data processing section (image processing means, an index image generating section, and title generating means) 112, a primary buffer (first image data storing means) 114, a band (secondary)

buffer (second image data storing means) 116, an image data control section (storage control means) 118, and a title selecting section (title selecting means) 120.

The image data processing section 112 executes predetermined image processing operations, including a data expanding operation, on original image data read from the memory card 10, in order to generate bit image data.

The image data processing section 112 is provided with an image data reading section 112a, an expansion processing section 112b, a rotation processing section 112c, a resizing section 112d, and an image correcting section (correction processing means) 112e. The image data reading section 112a reads original image data from the memory card 10 that stores image data taken with a digital camera or the like. The expansion processing section 112b expands (decompresses) the image data read from the image data reading section 112a. The rotation processing section 112c executes rotation processing of the image data for the purpose of the index print and the like. The resizing processing section 112d executes the scale-up/down processing of the image data. The image correcting section 112e executes the correction processing of the images.

The original data stored in the memory card 10 are file data having been compressed in, for example, JPEG format. The expansion processing section 112b executes expansion processing in accordance with the compression method of the original image data in order to restore the uncompressed original images.

The image correcting section 112e executes a variety of correcting operations, e.g., contrast adjustment, brightness adjustment, color balance correction, chroma adjustment, memorized color reproduction, sharpness improvement, noise reduction, outline correction, and the like, which have conventionally been executed by the personal computer side, e.g., by an image processing performed by a printer driver.

As described later, the image correcting section 112e executes the above-mentioned image correction processing on either the resized image or the image before the resizing processing, depending on the size of the image data after the resizing processing executed by the resizing section 112d.

The primary buffer 114 is composed of RAMs and the like, and temporarily stores the image data on which the image data processing section 112 has executed various image processing operations. The band (secondary) buffer 116 stores a band of image data before the printing operation.

Although the primary buffer 114 and the band (secondary) buffer 116 are separately provided in FIG. 3, these buffers can be made up of a single storage means (RAM).

The image data control section 118 executes a control operation for storing in the primary buffer 114 the bit image data generated by the image data processing section 112, and if necessary, a control operation for reading out a part of the bit image data from the primary buffer 114, in order to transfer the read data to the band (secondary) buffer 116.

When performing an index print, a title as shown in FIG. 1 (for example, "INDEX BANNER") is often printed together with the image data taken with the digital camera. The printer according to the present invention includes a title selecting section 120 which selects any among a plurality of titles prepared in advance. The details of the functions of the title selecting section 120 will be described later.

Figure 4:
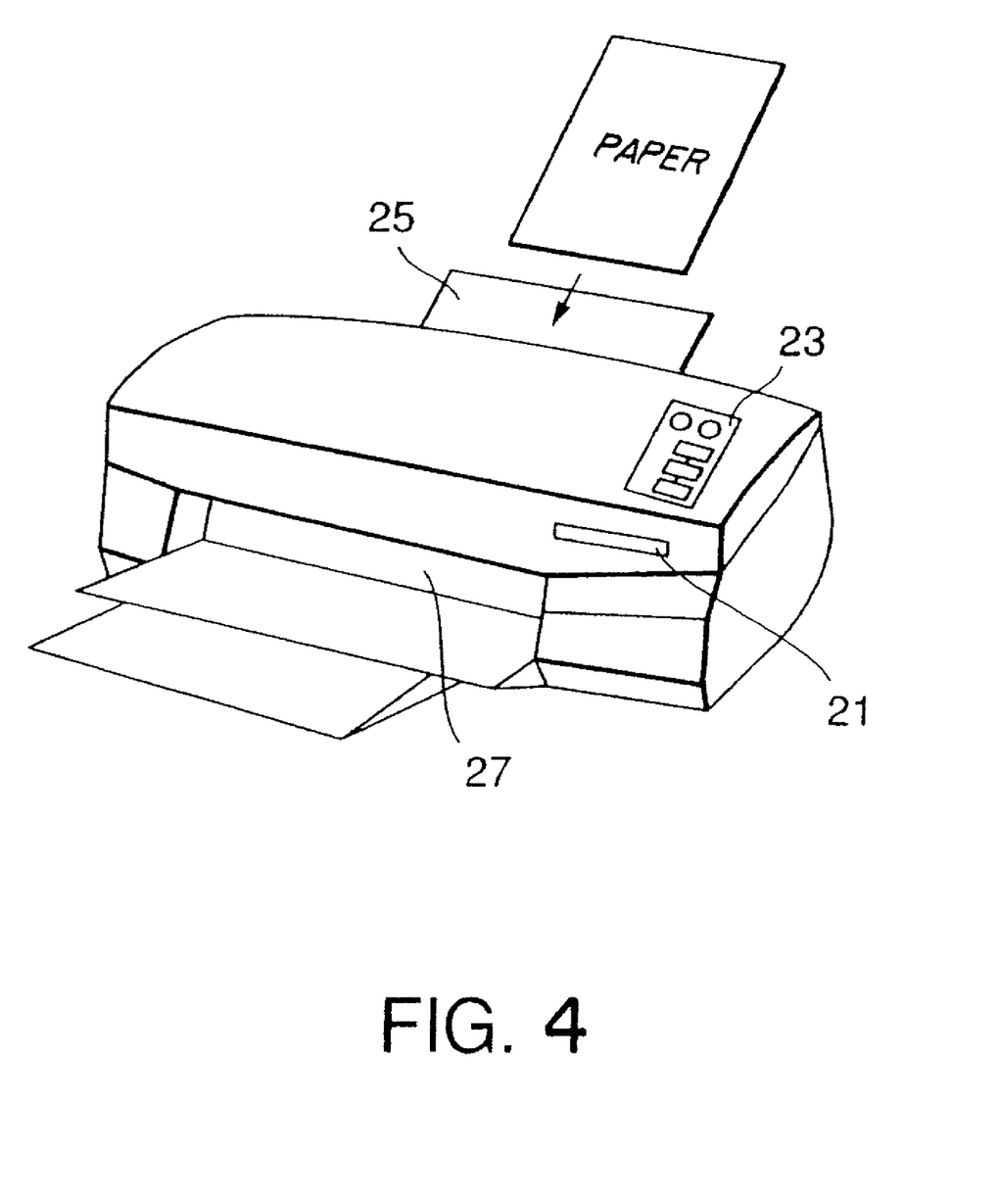
FIG. 4 shows an external appearance of the printer shown in FIG. 3.

FIG. 4 is an outline view of the printer according to the first embodiment. As shown in this drawing, there is no particular difference between this printer and conventional ink jet printers, except that the printer of FIG. 4 has a card inserting section 21 for inserting the memory card 10. Similarly to the conventional printers, the printer of FIG. 4 is provided with a operation panel section 23, a paper feeding section 25, a paper discharging section 27 and so on.

Figure 5:
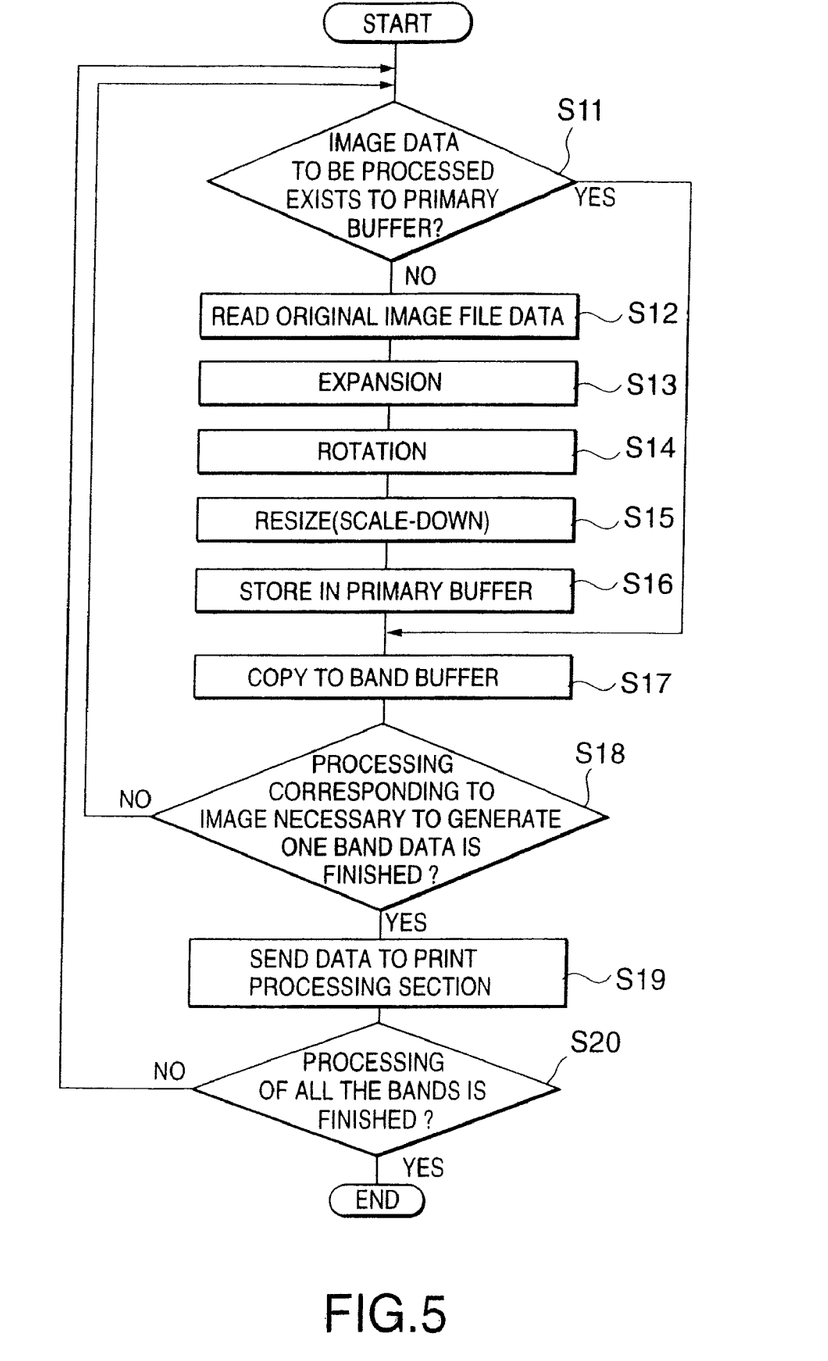
FIG. 5 is a flowchart of the processing procedure for making an index print by using the printer shown in FIG. 3.

FIG. 5 is a flowchart showing the processing steps for performing the index print by use of the printer of the first embodiment according to the present invention. Hereinafter, the operations of the printer will be described with reference to the drawings.

First, a user inserts the memory card 10 into the card inserting section 21 of the printer, and performs various settings for print through the operation panel section 23. It is assumed here that the user intends to perform the index print for A4 size paper placed horizontally, as shown in FIG. 1.

Next, the image data control section 118 determines whether or not all of the image data corresponding to the image A1 of FIG. 1 is stored in the primary buffer 114 (Step S11). It is assumed here that in the initial state, no data is stored in the primary buffer 114.

If it is determined that no data is stored in the primary buffer 114, the image data reading section 112a reads out a part of a plurality of original image data stored in the memory card 10 (Step S12). Initially, the image data corresponding to the image A1 of FIG. 1 is initially read out.

As the original image data stored in the memory card 10 is file data compressed in JPEG format or the like, the expansion processing section 112b expands the compressed data (Step S13).

Then, rotation processing is executed in order to rotate the original image by 90 degrees (Step S14), and scaling-down processing is executed in order to print a plurality of images (in FIG. 1, 20 images) on a single piece of paper (Step S15).

If, for example, the volume of the original image data stored in the memory card 10 was 1280 (pixel data)×960 (pixel data)×3 (Red, Green and Blue)=about 3.5 megabytes, the image data after the expansion process should have the same data volume. If the expanded image data is scaled down to one fourth the original size both lengthwise and crosswise, the volume of the scaled-down image data would be 320 (pixel data)×240 (pixel data)×3 (Red, Green and Blue)=about 225 kilobytes.

The image data that has been scaled down at Step S15 is stored in the primary buffer 114 (Step S16). That is, the bit image data obtained by rotating by 90 degrees and scaling down the first image A1 is stored in the primary buffer 114.

Next, the image data control section 118 copies one band data (in this case, "first band"), from the bit image data stored in the primary buffer 114 to the band (secondary) buffer 116 (Step S17).

The image data control section 118 then determines whether or not all the processing steps necessary for generating one band data (in this case, the first band) have been completed (Step S18). If not, the procedure returns to Step S11, and the above-mentioned steps S11 to S17 are repeated for the next image A2 (see FIG. 1).

First, it is determined whether or not the image data corresponding to the image A2 is stored in the primary buffer 114 (Step S11). At this time, the image data corresponding to the image A2 has not yet been stored in the primary buffer 114. Because of this, the image data reading section 112a reads the original image data of the image A2 from a plurality of original image data in the memory card 10 (Step S12). Then, the expansion processing section 112b expands the read data (Step S13). Consequently, the data is rotated (Step S14) and scaled down (Step S15) in the above-mentioned manner. The scaled-down bit image data are then stored in the primary buffer 114 (Step S16).

At this time, the image data corresponding to two images, i.e., the images A1 and A2, is stored in the primary buffer 114 in the rotated and scaled-down state. The image data control section 118 then reads one band data corresponding to the first band from the image data of the image A2 stored in the primary buffer 114 and copies it to the band (secondary) buffer 116 (Step S17).

The procedure from Step S11 to Step S17 is repeated until all the processing steps necessary for generating one band data (in this case, the first band) of band data have been completed (i.e., until the images A1 to A4 are processed when performing the index print shown in FIG. 1). Accordingly, the band data corresponding to the first band to be printed (the first band data corresponding to the images A1-A4) is stored in the band (secondary) buffer 116 and then sent to the print processing section 13 (Step S19).

The print processing section 13 executes a print job based on the received first band data. The image data control section 118 then determines whether or not all the processing steps have been completed for the entire bands (Step S20). If not, the procedure returns to Step S11, and the processing steps for the second band start.

Before starting the processing steps for the second band, the image data control section 118 determines whether or not the image data to be processed is stored in the primary buffer 114 (Step S11). If the image data is stored in the primary buffer 114, the image data control section 118 reads the image data corresponding to the second band from the primary buffer 114, and copies it to the band (secondary) buffer 116.

In this case, the second band data of the image A1 is first read from the primary buffer 114 and copied to the band (secondary) buffer 116, and then the second band data of the image A2 is read from the primary buffer 114 and copied to the band (secondary) buffer 116. Furthermore, the second band data of the image A3, and the second band data of the image A4 is read from the primary buffer 114 and copied to the band (secondary) buffer 116. Thus, the second band data of each of the first to fourth images is stored in the band (secondary) buffer 116.

As mentioned above, data of the band (secondary) buffer 116 in which the second band data of each of the four images A1 to A4 is stored are sent to the pint processing section 13 in order to perform the print operation. Through the above-mentioned procedure, the four images A1 to A4 is printed in the uppermost row on the paper 1 of FIG. 1.

Figure 6:
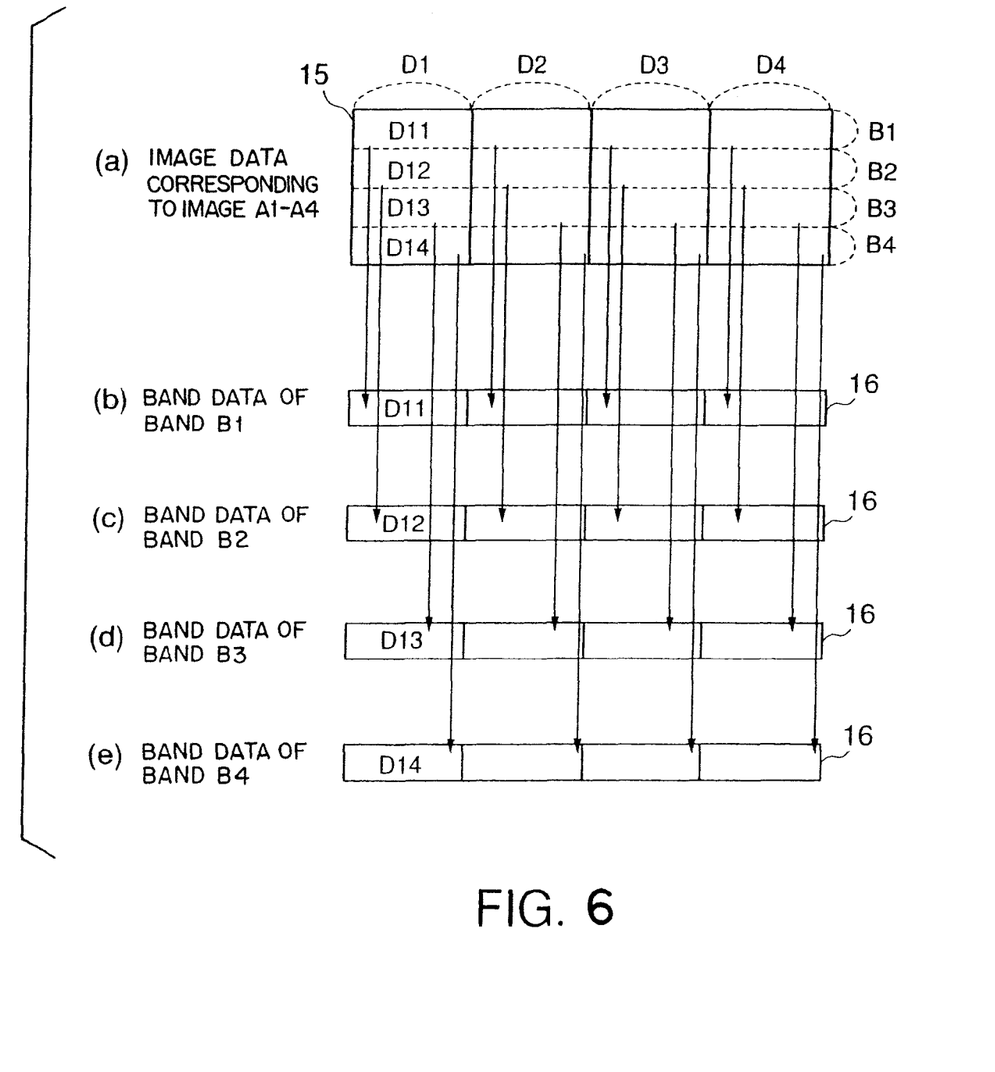
FIG. 6 shows the procedure to copy image data of the images A1 to A4 stored in the primary buffer 114 to the band (secondary buffer) 116.

The procedure mentioned above will be described in more detail below, with reference to FIG. 6(*a*)-(*e*). FIG. 6(*a*)-(*e*) illustrate the procedure to copy the image data corresponding to the images A1 to A4 stored in the primary buffer 114 to the band (secondary) buffer 116.

In FIG. 6(*a*), the symbols D1 to D4 denote scaled-down images corresponding to the images A1 to A4 of FIG. 1. As mentioned previously, each of data groups D1 to D4 has a data volume of 320 (pixel data)×240 (pixel data)×3 (RGB)=225 kilobytes.

The total data volume of all of D1 to D4 does not exceed 1 megabyte, which is far less than the capacity (a few megabytes) of the RAMs used as the primary buffer 114 and the band (secondary) buffer 116. Therefore, storing the scaled-down bit image data D1 to D4 in the primary buffer 114 and the band (secondary) buffer 116 would not result in the increase of the costs of the printer.

As mentioned before, in the first embodiment of the present invention, the scaled-down bit image data group D1 to D4 are divided into, for example, four bands (hereinafter referred to as "first to fourth bands B1 to B4"), and copied to the band (secondary) buffer 116 band by band.

As explained above with reference to the flowchart of FIG. 5, the scaled-down (and also rotated) image data of the image A1 is first generated, and its scaled-down bit image data D1 is stored in the primary buffer 114. Then, the scaled-down bit image data D11 corresponding to the first band of the scaled-down bit image data D1 is copied to the band (secondary) buffer 116. Next, the scaled-down (and also rotated) image data of the image A2 is generated, and its scaled-down bit image data D2 is stored in the primary buffer 114. Then, the scaled-down bit image data D21 corresponding to the first band of the scaled-down bit image data D2 is copied to the band (secondary) buffer 116.

The same procedure is applied to the images A3 and A4. Accordingly, the bit image data D11, D21, D31 and D41 corresponding to the first band B1 are copied to the band (secondary) butter 116, as shown in FIG. 6(*b*), in order to generate the band data of the first band B1.

When the processing of the next (second) band is started, it is first determined whether or not the image data to be processed is stored in the primary buffer 114 (Step S11 of FIG. 5), and the processing steps in accordance with the result is carried out.

As the image data corresponding to the image A1 as the first object to be firstly processed has already been stored in the primary buffer 114, Steps S12 to S16 are omitted, and Step S17 is carried out, i.e., among the bit image data D1 stored in the primary buffer 114, the bit image data D12 corresponding to the second band is copied to the band (secondary) buffer 116.

As the image data corresponding to the image A2 to be secondly processed has also been stored in the primary buffer 114, Step S17 is carried out, i.e., among the bit image data D2 stored in the primary buffer 114, the bit image data D22 corresponding to the second band is copied to the band (secondary) buffer 116. Similarly, as the image data corresponding to the images A3 and A4 is stored in the primary buffer 114, the processing of Step S17 is carried out as well.

Accordingly, the bit map image data for the second band is copied in the band (secondary) buffer 116, as shown in FIG. 6(*c*). The bands B3 and B4 are processed in the same way. As the result, bit image data is stored band by band in the band (secondary) buffer 116, as shown in FIGS. 6(*d*) and (*e*).

After the print processing for the images A1 to A4 in the first row shown in FIG. 1 is completed, the print processing for the second row starts. As can be seen in Step S11 of the flowchart of FIG. 5, the image data corresponding to the images to be processed (the images A5 to A8) have not yet been stored in the primary buffer 114. Therefore, the processing restarts from Step S12.

The above-mentioned processing steps are applied to the second band, the third band, . . . until all of the original images to be processed undergo the band processing. Ultimately, an index print as shown in FIG. 1 is obtained.

Thus, in the first embodiment of the present invention, the original image data corresponding to a plurality of bands is simultaneously read out from the memory card 10, and then several processing steps such as expansion, rotation and/or downscaling is performed, and then the resulted bit image data is stored in the primary buffer 114, and then the stored data is read out from the primary band buffer 114 band by band and transferred to the band (secondary) buffer 116 to perform the printing operation. Because of this, it is no longer necessary to read out and process the original image data in the memory card 10 band by band, thereby improving the speed of print processing.

Therefore, it is possible to simplify the print processing even if there are a plurality of images in the main scanning direction, as in the case of an index print, thereby improving the speed of printing operations. Therefore, the printing throughput would be significantly improved even in the process of performing the index print. Particularly, when the print processing includes a rotating process, as in the case of the first embodiment of the present invention, the processing time can be further shortened because it is no longer necessary to execute a rotating operation at each time when the band data is generated.

In the meantime, when images taken with a digital camera are rotated by 90 degrees in an index print, the title of the index print, e.g., "INDEX BANNER" of FIG. 1, should be also rotated. In this case, the scaled-down images and the title are printed so as to be oriented to the sub scanning direction of the carriage.

Figure 7:
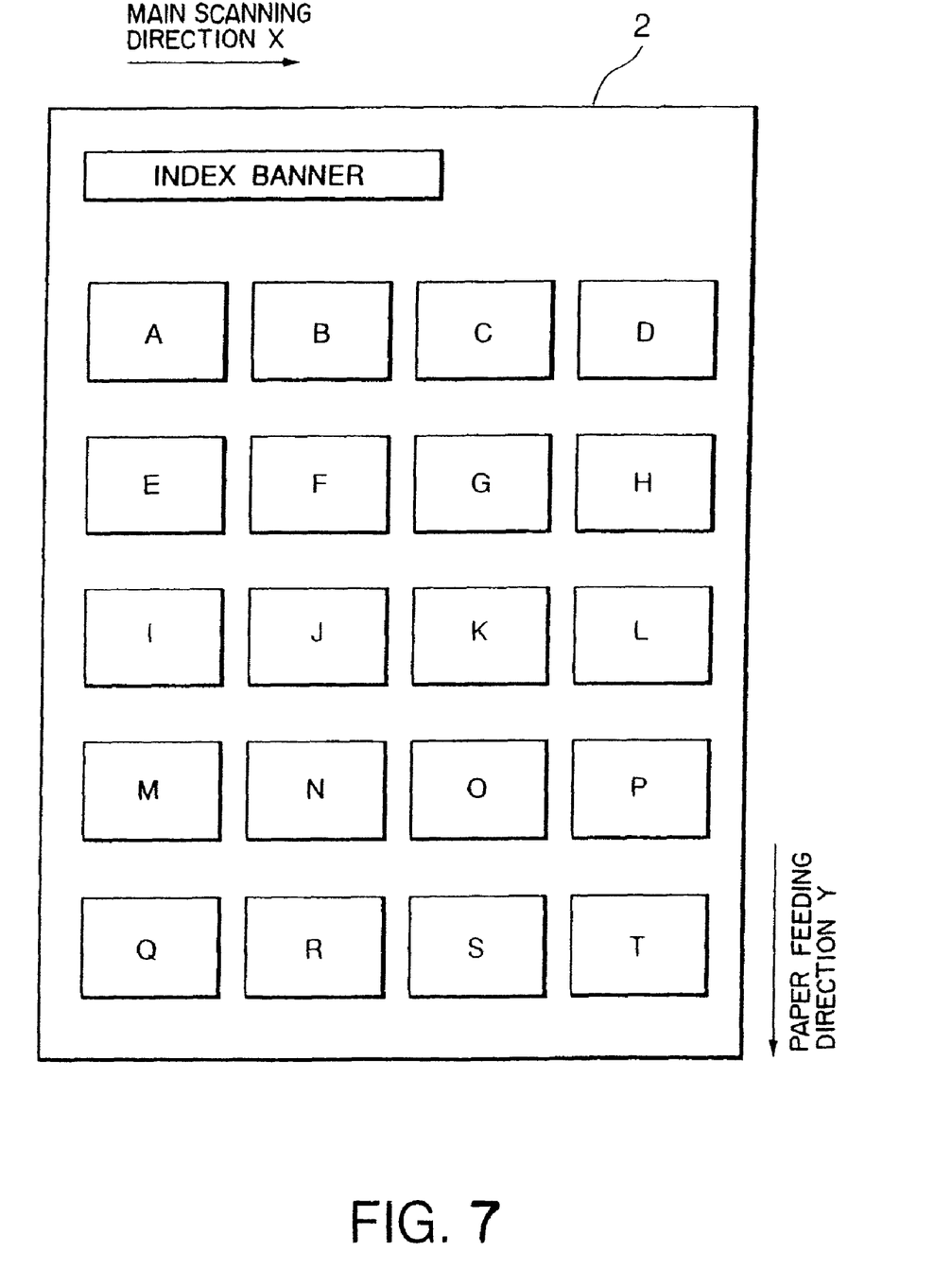
FIG. 7 shows another example of an index print, in which scaled down images are placed so that a viewer sees them correctly when the paper is placed vertically.

On the contrary, there is case of performing the index print in the original state, without rotating the image, as shown in FIG. 7. In this case, the scaled-down images and the title are printed so as to be oriented to the main scanning direction of the carriage.

As mentioned above, when the images are rotated, the title must also be rotated. The first embodiment of the present invention is provided with the title selecting section 120. In order to improve processing efficiency, the title selecting section 120 stores titles before the rotation process and the same title rotated by 90 degrees. The title selecting section 120 selects either a title before the rotation process or the same title after being rotated by 90 degrees depending on whether or not the original images are rotated, and sends the selected title to the print processing section 13. That is, the title selecting section 120 receives from the rotation processing section 112c information as to whether or not the original image were rotated, selects an appropriate title based on the information, and sends the result to the print processing section 13.

In short, if two kinds of titles are prepared in advance, it is possible to select a suitable title from these titles depending on whether or not the images are rotated. Therefore, when the images are rotated, it is no longer necessary to also rotate the title. Accordingly, the speed of the print processing can be improved.

Furthermore, as mentioned previously, the image correcting section 112e shown in FIG. 3 selects either the resized image or the image before the resizing processing, depending on the size of the image after the resizing process.

Specifically, in order to reduce the volume of data to be processed, the image correcting section 112e carries out the image processing by using the image that has less amount of data (pixels). For example, when the original image is enlarged and printed, the original image has less amount of data than the enlarged image. Therefore, the image correction processing is executed on the original image. On the contrary, when the original image is scaled down and printed, the image correction processing is executed based on the scaled down image.

More specifically, in the case of the enlarging process, the image correcting section 112e processes the image data before the resizing process, and in the case of the downscaling process, the image correcting section 112e processes the image data after the resizing process executed by the resizing section 112d. Thus, by choosing data that have fewer pixels, the image correcting section 112 can process less amount of data.

Second Embodiment

In order to reduce the cost, printer's memory capacity must be limited. Therefore, if the data of the original images stored in the memory card 10 is too large, or if a huge volume of data is to be printed, as in the case of an index print, the primary buffer 114 may not be able to store all of the bit image data corresponding to the original images.

Furthermore, if a printer is provided with, for example, an 8 megabyte RAM, a part of the RAM is used as the working area for the other processings such as a processing for converting RGB full color data to CMYK binary data. Therefore, in many cases, the memory capacity used as the primary buffer 114 and the band (secondary) buffer 116 is limited to only 1 to 2 megabytes.

Because of this, the second embodiment of the printer according to the present invention calculates the total data volume of the bit image data generated at the image data processing section 112. Only when the total data volume is less than the maximum memory capacity of the primary buffer 114, the generated image data are stored in the primary buffer 114, and otherwise the primary buffer 114 is not used.

Figure 8:
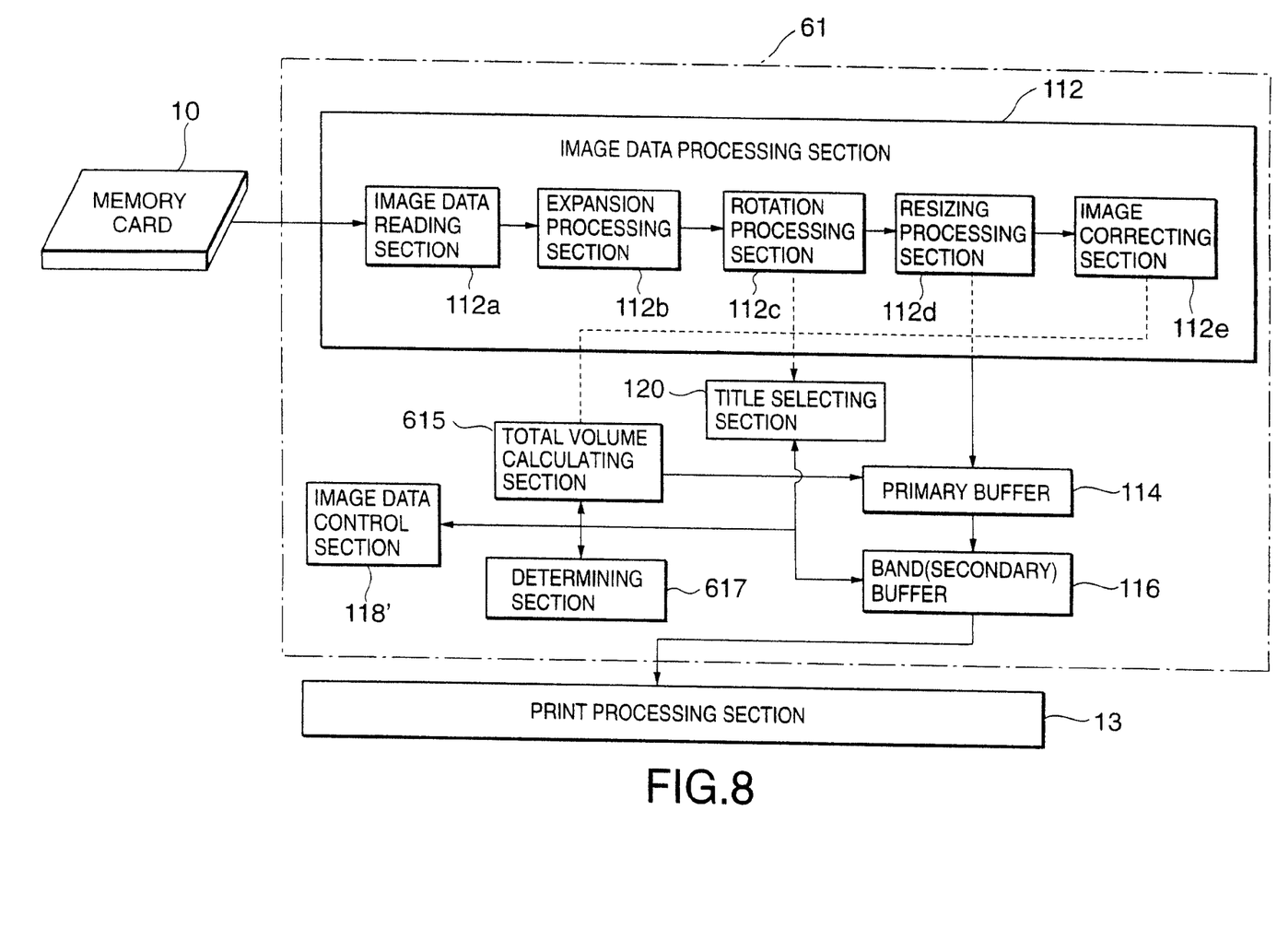
FIG. 8 is a block diagram showing the internal structure of a printer of the second embodiment according to the present invention.

FIG. 8 is a block diagram showing the internal structure of the printer according to the second embodiment. In FIG. 8, the elements common to those in FIG. 3 are assigned the same reference numerals. Hereinafter, the differences between the first and second embodiments will mainly be explained.

The printer shown in FIG. 8 includes a photo image processing section 61 and a print processing section 13. The print processing section 13 is configured in the same manner as that of the first embodiment.

The photo image processing section 61 operates in substantially the same manner as the photo processing section 11 of the first embodiment, and executes the image data processing on the original image data read from the memory card 10 in a manner similar to a personal computer. The photo image processing section 61 includes an image data processing section 112, a primary buffer 114, a band (secondary) buffer 116, an image data control section 118' and an index selecting section 120. Besides these, the photo image processing section 61 also includes a total volume calculating section 615 and a determining section (data volume determining means) 617.

When performing an index print, for example, the total volume calculating section 615 calculates, for each part of plural images printed through one main scanning, the total data volume of bit image data that would be generated at the image data processing section 112. The determining section 617 determines whether or not the total data volume calculated by the total volume calculating section 615 exceeds the maximum memory capacity of the primary buffer 114.

As will be described later, if the determining section 617 determines that the total data volume would not exceed the maximum memory capacity of the primary buffer 114, the image data control section 118' of the second embodiment stores the image data generated at the image data processing section 112 in the primary buffer 114, and if necessary, reads a part thereof from the primary buffer 114, in order to store the band (secondary) buffer 116.

On the other hand, if the determining section 617 determines that the total data volume would exceed the maximum memory capacity of the primary buffer 114, the image data control section 118' reads only the necessary part of the data from the memory card 10. After the image data processing section 112 processes the data, the image data control section 118' transfers the obtained bit image data to the band buffer 116.

The image data processing section 112 includes an image data reading section 112a, an expansion processing section 112b, a rotation processing section 112c, a resizing section 112d, and an image correcting section 112e, which are configured in the same manner as those in the first embodiment.

The primary buffer 114 is composed of RAMs, as in the case of the first embodiment, and has a memory capacity of several megabytes. In the second embodiment, it is assumed that the maximum memory capacity of the primary buffer 114 is 2 megabytes.

As mentioned before, the printer of the second embodiment is offered in light of the fact that in some cases the data volume of the original images stored in the memory card 10 is too large, and the primary buffer 114 is not capable of storing all of the bit image data generated at the image data processing section 112.

In the printer of the second embodiment, the total volume calculating section 615 calculates the total data volume of the bit image data generated at the image data processing section 112, and the determining section 617 determines whether or not the calculated total data volume exceeds the maximum memory capacity of the primary buffer 114. If it is determined that the calculated total data volume exceeds the maximum memory capacity of the primary buffer 114, a part of the original image data is read out from the memory card 10 and processed at the image data processing section 112 to generate bit image data, at every time a main scanning is executed.

Through such a procedure, it is possible for the printer to print bit image data having a data volume exceeding the maximum memory capacity of the primary buffer 114.

Hereinafter, the characteristic operations of the printer of the second embodiment will be described.

Utilizing the same example as the first embodiment, the volume of the original image data stored in the memory card 10 is 1280 (pixel data)×960 (pixel data)×3 (Red, Green and Blue)=about 3.5 megabytes, and the image data after the expansion process should have the same data volume.

If the expanded image data are scaled down (to one fourth the original size both lengthwise and crosswise), the volume of the scaled-down image data would be 320 (pixel data)×240 (pixel data)×3 (Red, Green and Blue)=about 225 kilobytes.

As explained before, the symbols D1 to D4 of FIG. 6(a) denote the scaled down image data corresponding to the images A1 to A4 stored in the primary buffer 114. Each of the scaled down image data D1 to D4 has the data volume of 320 (pixel data)×240 (pixel data)×3 (Red, Green and Blue)=about 225 kilobytes. Therefore, the total data volume of these four does not exceed 1 megabyte, i.e., not exceed the maximum memory capacity (2 megabytes) of the primary buffer 114.

However, if ten groups of scaled down data x1 to x10 (not shown), each having the data volume of about 225 kilobytes, are to be stored in the primary buffer 114, the total data volume would be 2.25 megabytes, which exceeds the maximum memory capacity (2 megabytes) of the primary buffer 114.

Therefore, if, in the intended index print, ten images each having the same data volume are to be printed through one main scanning, the total volume calculating section 615 calculates the total data volume (2.25 megabytes), and the determining section 617 determines that the calculated total data volume exceeds the maximum memory capacity (2 megabytes) of the primary buffer 114. Consequently, the data are not stored in the primary buffer 114, but at every time when the necessity arises, a part of the ten groups of original data stored in the memory card 10 are accessed and the accessed data is expanded, rotated, resized, and so on.

Figure 9:
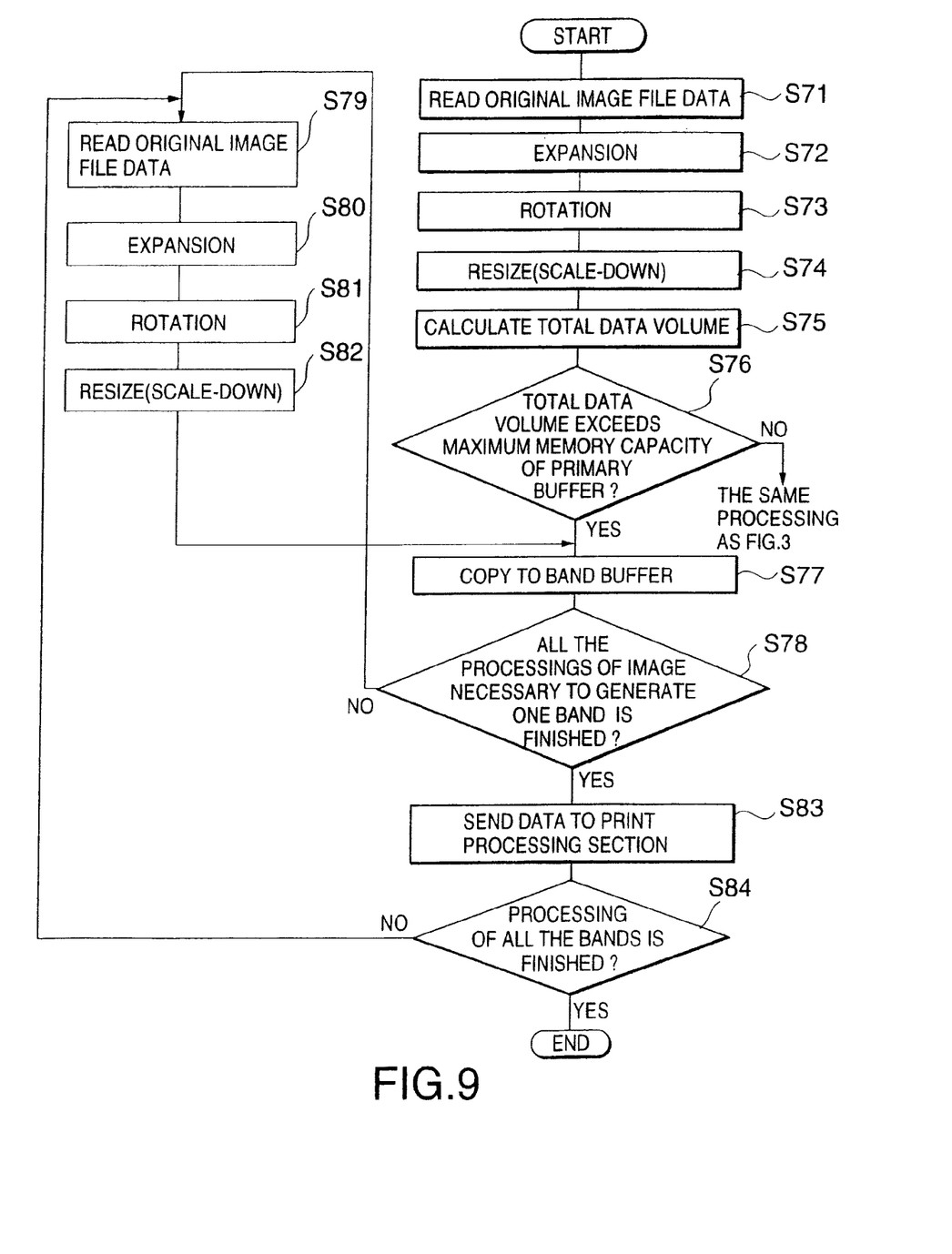
FIG. 9 is a flowchart of the processing procedure of the printer of the second embodiment.

FIG. 9 is a flowchart showing the processing operations of the printer of the second embodiment according to the present invention. Hereinafter, the processing operations of the printer of the second embodiment will be described with reference to this flowchart.

First, a user inserts the memory card 10 into the card inserting section 21 of the printer shown in FIG. 4, and performs through the operation panel section 23 various settings for print. It is assumed here that the user intends to perform an index print to print ten images in the main scanning direction.

Next, the image data control section 118' reads out, through the image data reading section 112a, the image data corresponding to the one image to be processed from a plurality of original image data stored in the memory card 10 (Step S71).

As the original image data stored in the memory card 10 is compressed in JPEG format or the like, the data are expanded (Step S72), rotated by 90 degrees (Step S73), and resized (in this case, scaled down) (Step S74).

Then, the total volume calculating section 615 calculates the data volume (about 225 kilobytes) of the scaled down image data x1, which has been scaled down at Step S74, and also detects, from the contents of the index print instructions the user has set through the operation panel 23, the number of images (10 pieces) in the main scanning direction. Consequently, the total volume calculating section 615 calculates the data volume of the image data x1 (=about 225 kilobytes)×10 (pieces) based on the above information, and obtains the total data volume of 2.25 megabytes (Step S75).

The obtained total data volume (2.25 megabytes) is inputted into the determining section 617. The determining section 617 compares the total data volume (2.25 megabytes) with the maximum memory capacity (2 megabytes) of the primary buffer 114, and determines whether or not the total data volume exceeds the maximum memory capacity of the primary buffer 114 (Step S76).

Then, the determining section 617 sends either of two different predetermined signals to the image data control section 118', depending on whether the total data volume exceeds the maximum memory capacity of the primary buffer 114 ("YES" at Step S76) or not ("NO" at Step S76).

If the total data volume exceeds the maximum memory capacity of the primary buffer 114, the image data control section 118' reads a band (in this case, the first band) of image data from the scaled down image data x1 and copies it to the band (secondary) buffer 116 (Step S77).

Then, the image data control section 118' determines whether or not all the processing steps necessary for generating a band (in this case, the first band) have been completed for all the image data (Step S78). If not ("NO" at Step S78), the image data of the second image (in this case the image X2) is read (Step S79), and the same processing steps are executed on the read image data-expansion (Step S80), rotation (Step S81), and downscaling (Step S82). Consequently, the processed band data is copied to the band (secondary) buffer 116 (Step S77).

This procedure is repeated until all the processing steps necessary for generating one band data (in this case the first band) have been completed for all the images X1 to X10.

When all the above-mentioned processing steps necessary for generating a band (in this case the first band) of band data have been completed for all the images X1 to X10 ("YES" at Step S78), the band data are sent to the print processing section 13 (Step S83).

Then, the image data control section 118' determines whether or not all the processing steps have been completed on all the bands (Step S84). If not ("NO" at Step S84), the image data control section 118' reads out through the image data reading section 112a, the original image data corresponding to the next band (in this case the second band) of the images to be processed (the images X1 to X10) (Step S79). The read data is expanded (Step S80), rotated (Step S81), scaled down (Step S82), and copied to the band (secondary) buffer 116 (Step S77). The same processing steps apply to all the bands.

On the contrary, if the total data volume does not exceed the maximum memory capacity of the primary buffer 114 ("NO" at Step S76), the image data control section 118' uses the primary buffer 114. That is, the image data control section 118' does not access the original image data in the memory card 10 at each time the necessity arises. In this case, the same procedure as in the first embodiment is performed, which was mentioned before with reference to FIG. 5. Therefore, the explanation of the sequence of these procedures is omitted.

With the printer according to the second embodiment of the present invention, it is possible to use the limited memory capacity most effectively in order to execute efficient processing. Therefore, it is possible to carry out efficient processing and improve printing throughput without the use of expanded memories.

Although the first and second embodiments of the present invention have been described above in detail, the present invention is not limited thereto. It is possible to apply the present invention as claimed to other embodiments.

For example, although the images are rotated in the first and second embodiments, the present invention can also be applied to the case where there is no rotation processing.

Furthermore, although index prints are performed in the first and second embodiments, the present invention can also be applied to the case where only one image is processed. That is, as it is possible to use the image data stored in the primary buffer to generate the second or more group of band data, it is not necessary any more to access the original image data at every time when the necessity arises in order to execute processing steps such as expansion, rotation and downscaling. Therefore, it is possible to improve the efficiency of processing steps.

It should further be noted that although the maximum memory capacity of the primary buffer was 2 megabytes in the second embodiment, it should not be limited to this number. Furthermore, although the total data volume (2.25 megabytes) was obtained by calculating "data volume of x1 (about 2.25 kilobytes)×10 (pieces)", the total data volume can be obtained by other ways.

Moreover, in the first and second embodiment, the photo image processing sections 11 and 61 shown in FIGS. 3 and 8 can be formed by either hardware or software. In the case of forming by software, the program for executing the functions of the photo image processing sections 11 and 61 can be copied on various recording medium such as a floppy disk and a CD-ROM, and distributed.

Furthermore, the program for executing the functions of the photo image processing sections 11 and 61 can be distributed via communication lines (including wireless communication) such as the Internet. Moreover, the program can be distributed in an encoded, modulated, or compressed state.

INDUSTRIAL APPLICABILITY

According to the present invention, it is possible for a printer to directly print, without the help of application software run on a computer, images taken with a device such as a digital camera. Furthermore, it is possible to process image data efficiently when a plurality of images are printed simultaneously, thereby improving the printing throughput.

As it is possible to perform an index print including many images without unnecessarily expanding the capacity of memories etc., it is possible to provide useful printers at lower prices.

The invention claimed is:

1. A printer for printing onto a print medium by moving a carriage having a print head alternately in a main scanning direction and a sub scanning direction, comprising:
   image processing means for generating bit image data by executing predetermined image processing on digital image data inputted from outside;
   first image data storing means for storing said bit image data;
   data volume determining means for determining whether or not the volume of said bit image data corresponding to images printed during one main scanning of said carriage exceeds the maximum memory capacity of said first image data storing means;
   storage control means for storing said bit image data in said first image data storage means when said data volume determining means determine that the volume of said bit image data corresponding to images printed during one main scanning of said carriage does not exceed the maximum memory capacity of said first image data storing means, and for providing a part of said digital image data necessary for (printing) to said image processing means without using said first image data storage means when said data volume determining means determine that the volume of said bit image data corresponding to images printing during one main scanning of said carriage exceeds the maximum memory capacity of said first image data storing means; and
   second image data storage means for storing said bit image data corresponding to images printing during one main scanning of said carriage, wherein when said data volume determining means determine that the volume of said bit image data corresponding to images printed during one main scanning of said carriage does not exceed the maximum memory capacity of said first image data storing means, said storage control means store, among the bit image data stored in said first image data storing means, the bit image data corresponding to images printed during one main scanning of said carriage in said second image data storing means, and when said data volume determining means determine that the volume of said bit image data corresponding to images printed during one main scanning of said carriage exceeds the maximum memory capacity of said first image data storing means, said storage control means store said bit e data generated by image processing means directly in said second image data storing means without storing it in said first image data storing means,
   wherein the image processing means includes:
      an image resizing means for executing a resizing processing on the digital image data inputted from outside; and
      an image correcting means for, comparing an image size of the resized digital image data and an image size of the digital image data before the resizing processing, executing a correcting processing on the resized digital image data in a case where the image size of the resized digital image data is smaller than the image size of the digital image data before the resizing processing, and executing the correcting processing on the digital image data before the resizing processing in a case where the image size of the digital image data before the resizing processing is smaller than the image size of the resized digital image data.

* * * * *